No. 658,624. Patented Sept. 25, 1900.
G. EGGER.
BOTTOM BRACKET.
(Application filed Feb. 6, 1899.)
(No Model.)
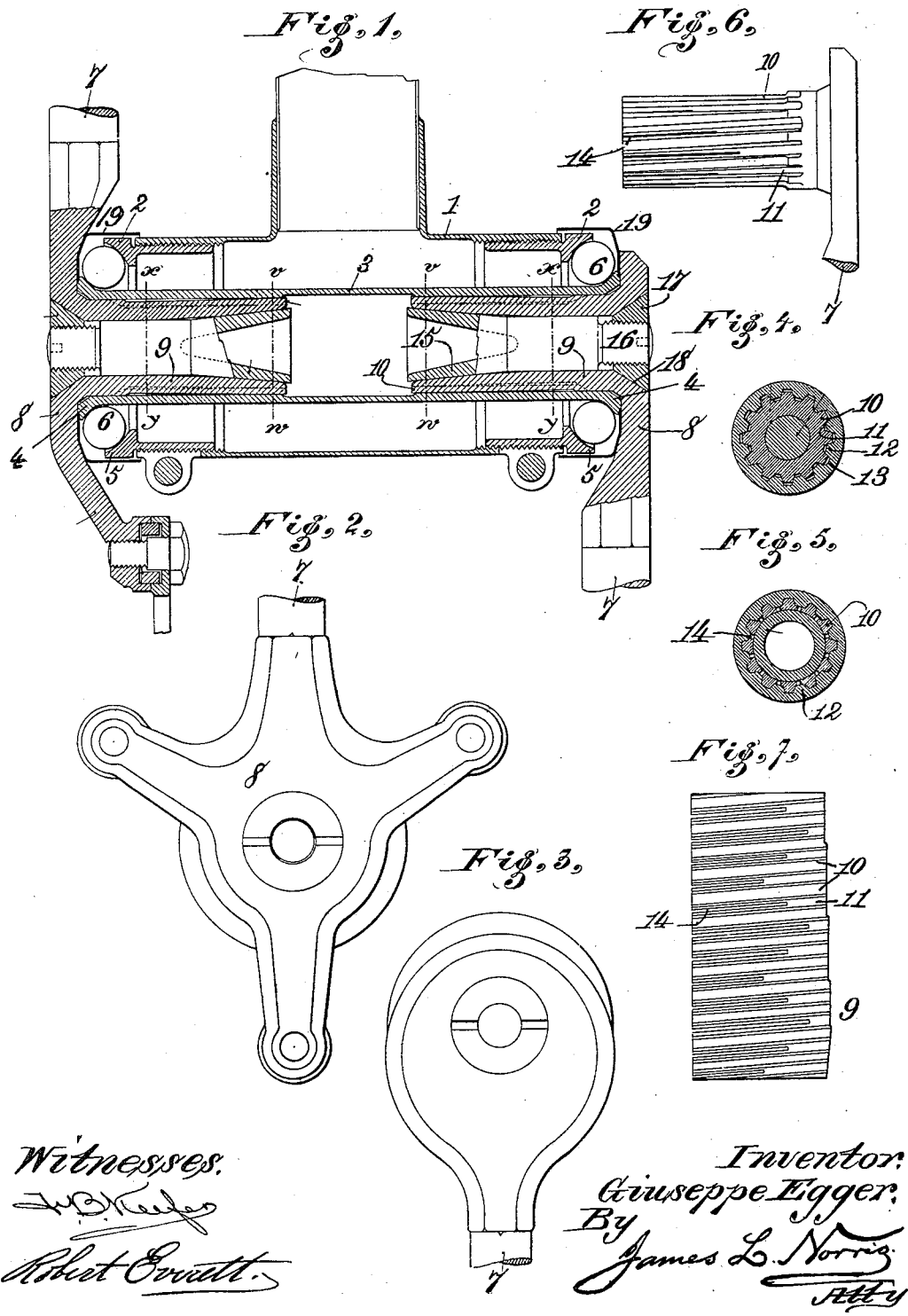
Witnesses.
Inventor.
Giuseppe Egger,
By James L. Norris
Atty.

UNITED STATES PATENT OFFICE.

GIUSEPPE EGGER, OF TRIEST, AUSTRIA-HUNGARY.

BOTTOM BRACKET.

SPECIFICATION forming part of Letters Patent No. 658,624, dated September 25, 1900.

Application filed February 6, 1899. Serial No. 704,713. (No model.)

*To all whom it may concern:*

Be it known that I, GIUSEPPE EGGER, engineer, a subject of the Emperor of Germany, residing at Triest, Austria-Hungary, have invented certain new and useful Improvements in Bottom Brackets, of which the following is a specification.

This invention relates to crank-hangers for bicycles, and has for its object to provide simple, durable, and inexpensive mechanism for supporting and connecting the cranks and by means of which the parts may be readily and accurately assembled and easily detached and removed.

It has for a further object to provide in such mechanism improved means for rigidly connecting together the cranks in such manner that they will invariably maintain the proper angle relatively one to the other, and, finally, it has for its object to provide improved means which while permitting the ready detachment and separation of the parts will effectually prevent any accidental displacement thereof.

To these ends my invention consists in the features and in the construction, combination, and arrangement of parts hereinafter described, and particularly pointed out in the claim, reference being had to the accompanying drawings, forming a part of this specification, wherein—

Figure 1 is a vertical central longitudinal sectional view of the crank hanger and bearing. Fig. 2 is an end view of the right side thereof. Fig. 3 is a similar view of the left side. Fig. 4 is a transverse section taken on the line $x\,y$, Fig. 1. Fig. 5 is a similar view taken on the line $v\,w$, Fig. 1. Fig. 6 is a detail view of one of the crank-axles, showing a slightly-modified construction; and Fig. 7 is an enlarged detail view of the inner end of a crank-axle such as shown in Fig. 6.

Referring to the drawings, the reference-numeral 1 indicates the tubular crank-axle bracket formed and attached to the bicycle-frame in the usual manner. The opposite ends of the tubular bracket 1 are internally threaded, and screwed therein are the ball-bearing thimbles 2, which are adapted to be screwed in and out of the bracket to adjust the bearings. Disposed centrally in the bracket 1 is a sleeve or hollow crank-axle 3, the opposite ends of which are externally coned, as at 4, said coned ends, in connection with the correspondingly-coned ends 5 of the thimbles 2, forming bearings or races for the antifriction-balls 6, whereby the hollow axle is given a rolling bearing in the crank-axle bracket.

The numeral 7 indicates the cranks, which at their inner ends terminate in flat disks 8, that abut the ends of the hollow axle, and from the inner faces of said disks project hollow cylindrical bosses 9, which are fitted in the opposite ends of the hollow axle. Each of said bosses is provided exteriorly with a plurality of alternate longitudinal ribs and grooves, respectively numbered 10 and 11 in the drawings, each of the grooves being trapezoidal in cross-section and tapering from their outer to their inner edges—that is to say, said ribs and grooves gradually decrease in cross-sectional area from their outer to their inner edges. The ends of the hollow axle 3 are provided internally with corresponding-shaped ribs and grooves 12 and 13, the ribs on the bosses 9 accurately fitting the grooves in the hollow axle 3, and vice versa. When the bosses are driven into the ends of the hollow axle, the ribs 10 and 12 are forced into intimate contact with each other and exert a wedge-like action, making the connection between the cranks and axle extremely firm and rigid and insuring the cranks being accurately set at an angle of one hundred and eighty degrees relatively to each other. Instead, however, of forming the ribs and grooves longitudinally on the bosses and hollow axle, they may be made obliquely—that is to say, may be given a slight spiral twist in manner similar to the rifling of a gun-barrel, as indicated in Fig. 6, the twist being preferably left-handed, as in a left-hand-threaded screw.

In practice the pressure exerted by the rider in pedaling has a tendency to work the bosses out of the hollow axle, and this result is avoided by the following means: The bosses 9 are slitted at their inner ends, said slits being preferably formed between the ribs, as indicated at 14, Fig. 7, where the bosses are thinnest, and the inner ends of said bosses are hollowed out conically, as shown in Fig. 1 of the drawings. Inserted in the hollow bosses from their inner ends are screws having conically-shaped heads 15, said screws at their outer ends being provided with threaded shanks 16. Nuts 17 are screwed over the threaded shanks of the screws and seat themselves in countersinks 18, formed in the crank-disks 8. When the nuts 17 are screwed up, they draw the conical heads 15 outward, and thus expand the slitted inner ends of the bosses and cause them to tightly grip the interior of the hollow axle. Owing to the trapezoidal form of the ribs 10 in cross-section, they are wedged into the corresponding-shaped grooves 13 in the hollow axle when the slitted ends of the bosses are spread or expanded in the manner above described, whereby great resistance or friction is created between the ribs 10 and 12, thereby effectually preventing any endwise movement of the bosses in the hollow axle and preventing either crank from becoming loose, owing to the torsional strain produced by pedaling.

Cup-shaped metallic caps 19 are gripped at their inner edges between the ends of the cones 4 and the inner faces of the axle disks 8 and at their outer edges are curved inwardly over and surround the outer ends of the thimbles 2. Said caps constitute covers which operate to protect the bearings from dust, dirt, and the like.

The disk 8 of the right-hand crank is provided with radially-extending lugs to which the chain-wheel may be attached in any suitable manner.

Having described my invention, what I claim is—

The combination with a hollow crank-axle having a plurality of alternate ribs and grooves formed internally in its inner ends, said ribs and grooves being slightly oblique and trapezoidal in cross-section, of disks arranged over the opposite ends of said axle and each formed with a crank, hollow cylindrical bosses formed on the inner face of said disks and provided externally with alternate ribs and grooves corresponding in shape and obliquity to and fitted between the ribs and grooves on the interior of the axle, the inner ends of said bosses being slitted endwise and hollowed out conically, conically-headed screws fitted in said hollow bosses, and means for drawing said screws outward to spread the inner ends of the bosses and wedge the ribs thereon between the corresponding ribs on the interior of the axle, substantially as described.

In testimony whereof I have hereunto set my hand in presence of two subscribing witnesses.

GIUSEPPE EGGER.

Witnesses:
VINCENT BURES,
ANTONIO GHEZZO.